(12) United States Patent
Fujishima et al.

(10) Patent No.: US 6,690,982 B1
(45) Date of Patent: Feb. 10, 2004

(54) METHOD AND DEVICE FOR DETERMINING OPERATION BALANCE OF MACHINES

(75) Inventors: Makoto Fujishima, Yamatokoriyama (JP); Yasushi Fukaya, Niwa-gun (JP); Sadayuki Matsumiya, Kawasaki (JP); Kazuo Yamazaki, 1500 7th St. #7-0, Sacramento, CA (US) 95814

(73) Assignees: Mori Seiki Co., Ltd., Yamatokoriyama (JP); Okuma Corporation, Nagoya (JP); Mitutoyo Corporation, Kawasaki (JP); Kazuo Yamazaki, Sacramento, CA (US)

( * ) Notice: Subject to any disclaimer, the term of this patent is extended or adjusted under 35 U.S.C. 154(b) by 0 days.

(21) Appl. No.: 09/529,992

(22) PCT Filed: Aug. 24, 1998

(86) PCT No.: PCT/JP98/03747
§ 371 (c)(1),
(2), (4) Date: May 16, 2000

(87) PCT Pub. No.: WO00/11582
PCT Pub. Date: Mar. 2, 2000

(51) Int. Cl.[7] .............................................. G06F 19/00
(52) U.S. Cl. ........................... 700/99; 700/36; 700/108
(58) Field of Search .......................... 700/99, 108, 174, 700/36, 97; 705/7

(56) References Cited

U.S. PATENT DOCUMENTS

| | | | | |
|---|---|---|---|---|
| 5,249,120 A | * | 9/1993 | Foley | 700/36 |
| 5,946,212 A | * | 8/1999 | Bermon et al. | 700/97 |
| 5,999,920 A | * | 12/1999 | Sato et al. | 700/99 |
| 6,223,092 B1 | * | 4/2001 | Miyakawa et al. | 700/99 |

FOREIGN PATENT DOCUMENTS

JP     A-6-318103     11/1994

* cited by examiner

*Primary Examiner*—Albert W. Paladini
(74) *Attorney, Agent, or Firm*—Oliff & Berridge, PLC

(57) ABSTRACT

A method and device to automatically determine the operation balance of processing/assembly machines such as NC machine tools. The device detects the machine operations related to income and expenditure as income/expenditure data and stores the income and expenditure amounts in a memory based on the detected income/expenditure data and calculates the income/expenditure balance of the individual machines for an arbitrary period based on the stored income and expenditure amounts. In the NC machine tool, the operations related to the income and expenditure can be detected while monitoring the execution statuses of the NC program. By calculating the income/expenditure amounts with multiplication of such operations by the predetermined unit prices of income or expenditure and subtracting the expenditure amount from the income amount, the operation balance of the machine for each cycle or every week or month can be determined.

10 Claims, 3 Drawing Sheets

Fig. 2

| INCOME | EXPENDITURE |
|---|---|
| 1. SALES INCOME | 1. MATERIAL COSTS |
| 2. MISCELLANEOUS INCOME | 2. PERSONNEL EXPENSES |
| | 3. POWER RATES |
| | 4. DEPRECIATION COSTS |
| | 5. TOOL CONSUMPTION COSTS |
| | 6. COOLANT/LUBRICATION OIL COSTS |
| | 7. MAINTENANCE CHARGES |
| | 8. MISCELLANEOUS COSTS |

Fig. 3

| ITEM | INCOME | EXPENDITURE | DATE AND TIME | ATTRIBUTE 1 | ATTRIBUTE 2 | ATTRIBUTE 3 |
|---|---|---|---|---|---|---|
| DEPRECIATION COST | | 3800 | 1997.10.01 | | | |
| MATERIAL | | 2000 | 1997.10.01 8:21 | O1111 | | |
| POWER RATES | | 20 | 1997.10.01 9:00 | | | |
| LUBRICATION OIL | | 85 | 1997.10.01 9:00 | | | |
| PARTS SALES | 10000 | | 1997.10.01 9:08 | O1111 | | |
| MATERIAL | | 2000 | 1997.10.01 9:18 | O1111 | | |
| WORKPIECE SALES | 10000 | | 1997.10.01 9:55 | O1111 | | |
| POWER RATES | | 128 | 1997.10.01 10:00 | | | |
| COOLANT | | 185 | 1997.10.01 10:00 | | | |
| LUBRICATION OIL | | 50 | 1997.10.01 10:00 | | | |
| PERSONNEL EXPENSES | | 5000 | 1997.10.01 9:00 | 1997.10.01 12:05 | | |

METHOD AND DEVICE FOR DETERMINING OPERATION BALANCE OF MACHINES

TECHNICAL FIELD

The present invention relates to a method and device for determining the operation balance of machines, and more particularly to a method and device which can determine the operation balance of NC machine tools, individually and for any arbitrary period, by monitoring and analyzing the actual processing status of such machine tools.

BACKGROUND ART

For processing or assembly of parts, specific machine tools or assembly machines are installed in various production facilities. According to the general plant management method conventionally adopted, initial costs including purchase prices and installation cost, as well as maintenance costs, are calculated as expenditure for individual machines and the share of their costs are assumed in the profit of the entire production organization.

However, it is simply not possible to correctly determine the contribution of individual machines by such rough assumption in conventional practices. For plant managers or top management, correctly understanding the operation balance of an individual machine has been an important problem.

In general, the operation balance of a machine can be determined by subtracting the maintenance/management costs for the machine including machine management costs, personnel expenses and depreciation costs from its profit. However, it has been impossible to continuously and automatically monitor the income and expenditure related to particular individual machines in conventional business. In particular, in light of the labor required for calculation, it is not realistic to calculate costs of consumables, such as tools and power rates, corresponding to the operation status of each machine.

An example of such machines is a machine tool controlled by a numerically controlled (NC) program. Many NC machine tools are used in various processing sites. It is well known that, in a CNC machine tool, a CNC device analyzes the program usually known as NC statements and controls the feed motor. A PLC (Programmable Logic Controller) device typically incorporated in a CNC device analyzes the program and simultaneously controls the spindle motor and mechanical sections of tool changer, workpiece changer or coolant device. In addition, it is known that some CNC machine tools incorporate an automatic programming device to automatically generate the NC statements and to send codes other than NC statements to the CNC device and the PLC device. The CNC or PLC device displays the operation hours and counts the number of processed workpieces as additional information when the above controls are executed.

However, even such advanced conventional CNC devices cannot calculate the balance between income and expenditure to grasp the operation status. The machine user remains unable to learn how a specific machine contributes to the balance on a real time basis.

DISCLOSURE OF THE INVENTION

The present invention develops the operation time indication or processed workpiece counting used in the conventional CNC devices as described above, detects machine operation statuses as operations related to income and expenditure of the machine by monitoring and analyzing the NC program execution statuses, and calculates the operation balance using them. As a result, the profit ratio of the machine over any arbitrary period can be determined making it possible to more effectively use the machine.

For this purpose, the present invention is characterized in that it detects income/expenditure-related machine operations as income/expenditure data, stores income/expenditure amounts in the memory based on the detected income/expenditure data, and, based on such stored income/expenditure amounts, calculates the income/expenditure balance of the individual machine over any arbitrary period.

Further, it may be useful to adopt machine tools controlled according to NC programs as such machines. By monitoring the NC program execution statuses, the operations related to income/expenditure of the machine tools can be detected as the income/expenditure data. In the present invention, income/expenditure data refers to the data obtained by detection of operations related to income/expenditure where income and expenditure are actually generated in each individual machine tool. In the case of NC machine tools, such data are detected from execution statuses of the NC program.

To determine the income/expenditure amounts from the income/expenditure data, the sales price of the processed product and the expenditure such as the material unit price and personnel expense unit price stored in advance in the income/expenditure price registration unit may be used. The income/expenditure balance data can be stored in the memory along with the date and time when such operation balance occurs. It may further be preferable to add the attribute information required to identify the type of the operation balance to the income/expenditure amounts stored in the memory.

In the present invention, the income/expenditure calculation is made for an arbitrary period basically by the operation to subtract the total expenditure from the total income. The arbitrarily selected period may be selected from predetermined periods, such as every week or every month. The income/expenditure calculation results for the individual periods are displayed on a display unit.

The operation balance items in the present invention preferably include the sales income and miscellaneous income as income items and expenditure items such as material costs, personnel expenses, power rates, depreciation costs, tool consumption costs, coolant/lubrication oil costs, maintenance charges, and miscellaneous costs.

In a method and device in which the present invention is applied, the machine for operation balance calculation may be a single unit, or may be several devices connected via network. The method to calculate the operation balance can be described as computer programs, which can be incorporated into CNC software or PLC software as applications for CNC device or can be incorporated to the personal computer section of open CNC.

When several machines are connected via a network as referenced to above, operation balances of various processes can be displayed and checked on a single computer by incorporating the operation balance calculation program into a PC connected to the network. This can be useful for control of machines, as well as monitoring and analysis of contribution ratios of the machines.

Referring to the attached drawings, preferred embodiments of the present invention will be described in detail below.

BRIEF DESCRIPTION OF THE DRAWINGS

FIG. 2 is a chart showing income and expenditure items in an embodiment according to the present invention; and FIG. 3 is a chart showing a specific example of income/expenditure data and income/expenditure amounts used in an embodiment of the present invention.

BEST MODE FOR CARRYING OUT THE INVENTION

Figure 1:
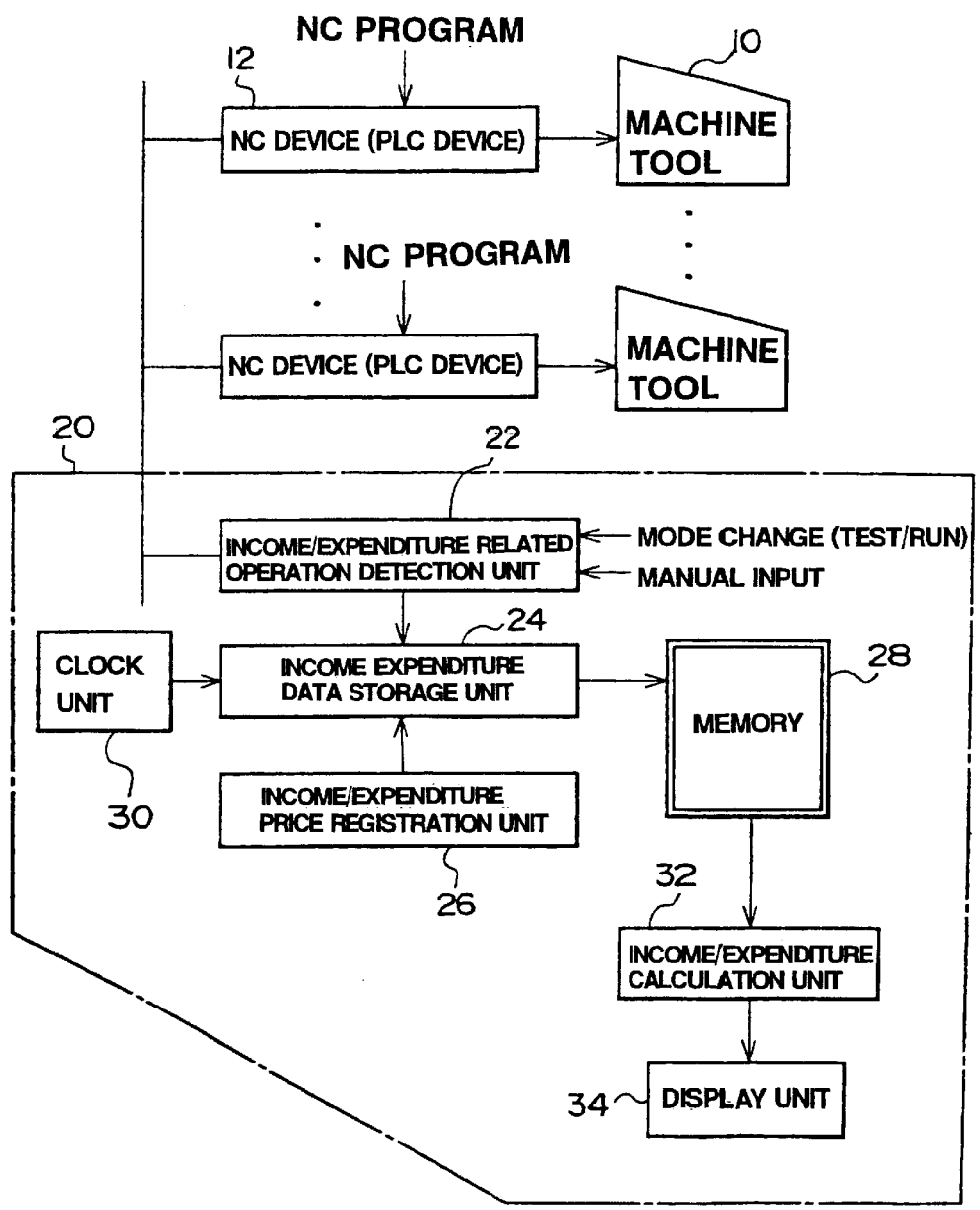
FIG. 1 is a schematic configuration diagram showing a preferred embodiment illustrating a method and device to determine the operation balance of a machine according to the present invention.

FIG. 1 shows a preferred embodiment where a method and device to determine the operation balance according to the present invention are applied to an NC machine tool. In the figure, a plurality of NC machine tools 10 are connected via network. Each machine tool is controlled by an NC device 12 having a PLC device inside. To each of the NC devices 12, an NC program suitable for processing by the applicable machine tool 10 is supplied. Using the NC program, the machine tool 10 executes a predetermined processing operation.

The present invention is characterized in that a device 20 to determine the operation balance is connected to the above network. The device 20 comprises an income/expenditure-related operation detection unit 22 which collects information about the NC program execution status in each NC device 12 from the network, detects the income/expenditure-related operations as income/expenditure data, and supplies the data to an income/expenditure data storage unit 24. A mode switching signal is supplied to the income/expenditure-related operation detection unit 22, so that the detection unit 22 can determine whether the machine tool 10 is conducting test operation or actual processing operation and invalidates the income/expenditure data detection in case of test operation. A manual input signal can also be supplied to the detection unit 22 so that income/expenditure-related operations which cannot be detected from the NC or PLC device can be manually input.

Individual unit prices for income and expenditure are supplied from an income/expenditure price registration unit 26 to the income/expenditure data storage unit 24. The storage unit 24 calculates the actual income/expenditure amounts using the income/expenditure data and the unit prices in the registration unit 26 and stores them into a memory 28. The income/expenditure data storage unit 24 is also connected to a clock unit 30 so that the date and time when each income or expenditure item is generated can be stored in the memory 28 together with the income/expenditure amount.

The income/expenditure amounts in the memory 28 can be arbitrarily read out to an income/expenditure calculation unit 32. The income/expenditure calculation unit 32 calculates the income/expenditure amounts read from the memory 28 as data for an arbitrary period and, by subtracting the expenditure from the income, calculates the operation balance result for the arbitrary period and displays it on a display unit 34.

According to the present invention, the operation balance contains the income and the expenditure. FIG. 2 shows preferable income and expenditure items for the NC machine tool. As can be understood from the figure, two types of income items are recognized: sales income and miscellaneous income. The. expenditure items include material costs, personnel expenses, power rates, depreciation costs, tool consumption costs, coolant/lubrication oil costs, maintenance charges and miscellaneous costs.

The operation balance is explained below separately for the income and the expenditure.

1. Income of the Machine (1) Sales Income by Parts

The NC machine tool processes the material to produce parts. The parts may be sold directly as products, may be processed in the next processing process by another NC machine tool, or may be sent to the assembly process and incorporated into a product. It is assumed here that the price of the part produced by the applicable NC machine tool is determined by a process or processing machine.

Income/expenditure Detection means

Completion of part processing is usually detected by M function (M02 or M30) at the program end in NC statements. When the program end instruction is executed, the CNC device (or PLC device) stops the machine. Until the signal for processing start is input (usually an activation button is pressed) next time, the stopped status is maintained. In the case of a machine where the finished processed parts are automatically removed and materials are supplied, the program end execution may be omitted. In such a case, NC statements are often provided at the end with M function (commonly M99) instruction for return to the beginning of the program and for program execution so that the program is repeated. If the M code at the program end is omitted, the M code for workpiece processing completion is set in the parameter and it is assumed that one workpiece having the applicable program No. is completed when such M code is given as instruction. In the case of a system with a measuring instrument in the machine, the NC program can judge whether or not the measurement results are acceptable. The M code for defect detection is decided in advance so that any defect occurrence can be checked by the detection means. If the automatic measuring device is installed outside of the machine, it is designed to apply a defective product mark via I/O of the PLC. To reflect defect judgment for the workpiece according to manual measurement, "Good" and "No Good" marks can be changed by manual setting from the CNC input device. Considering a case where sale of the products is halted because of test results, the system is provided with a means for selecting test or operation mode. In the test mode, part sales profits are not calculated.

Income/expenditure registration means

This enables registration of sales prices by program No. Even if the part is not directly sold as a product, it is necessary to register a tentative sales price.

Income/expenditure storage means

Upon detection of processing completion by the detection means, data with the following attributes are stored for each item.

① Processing completion date (Date and time)
② Program No.
③ Defective product flag (Workpiece with this flag is counted for material expenditure only. It is not counted for income.)
④ Workpiece sales price (2) Miscellaneous Income Any amount to be counted other than the usual income by sales of workpieces can be added to the income by setting from the NC input device. For example, when the parts judged defective in the measurement process are sold as materials, the income is registered as miscellaneous income.

Income/expenditure detection means

This is for manual setting of any income other than processing charge.

Income/expenditure registration means None

Income/expenditure storage means Income data is stored every time any setting is provided. Attributes are as follows:

① Date and time (This item is automatically set in the input process. It can be corrected manually).
② Description
③ Cost 2. Expenditure
(1) Material Cost The NC machine tool processes the material to manufacture parts. Material cost here refers to the price of the article before processing. If the material is processed by another machine in the previous process, it is necessary to set the price including the cost of such processing. This cost is counted as an expenditure every time one piece is input.

Income/expenditure detection means

It is assumed that the material cost is incurred when the program starts. The PLC usually conducts the cycle start processing and notifies the CNC of the program start. The detection means detects such notification signal. The NC device has single block and temporary stop functions and, when these operations are executed, conducts several cycle start processes for single processing. Even in this case, it is necessary to count only one of them, and the start of the program must be detected. A predetermined M code may be instructed at the beginning of the program so that it can be used as detection means. In test mode, the material may or may not be consumed and it is difficult for the system to distinguish these two cases. Therefore, material expenditure is not counted.

Income/expenditure registration means

Material cost is set for each program number.

Income/expenditure storage means

Data is stored every time one piece of material is input. Attributes are as follows:

① Date of processing start (Date, hours, and min.)
② Program No.

(2) Personnel Expenses

Although the NC machine tool automatically executes processing, an operator is needed to supply materials, take out parts, change tools, and perform other actions for maintaining the machine operation. The operator controls several machines in most cases and it is difficult for the system to detect when the operator is engaged in operation of a particular machine. For detection of engagement with a machine, it is possible to have the operator make operation as such. Here, however, the expected personnel expenses for machine operation per unit hour is set in advance. The personnel expenses are determined by multiplying such unit cost by the operation time.

Income/expenditure detection means

Time while the CNC power is on is used as the time of operator's engagement with the machine. Because the CNC has a clock, the CNC calculates such time by detecting the power-on and power-off In the case of a CNC device without a power shutdown process (the system for which the power is turned off after execution of processing required for shutdown), it may be difficult to detect and store the shutdown time. It is also acceptable that the time be continuously counted while the power is on.

Income/expenditure registration means

The personnel expense per unit time is manually set. If an operator is working for several machines at a time, it should be taken into consideration.

Income/expenditure storage means

The cost should be calculated and stored by multiplying the time from power-on to power-off by the personnel expense per unit time. Attributes are as follows:

① Power-on date and time
② Power-off date and time
③ Cost (Time×Personnel expense per unit time)

(3) Electricity Charge

The NC machine tool converts the electrical energy into kinetic energy through an actuator such as a motor, so as to achieve spindle rotation and axis motion required for processing. This provides a means for calculating the charge for such electricity. An integrating wattmeter is mounted on the power supply so that its output is monitored by the CNC. The amount obtained by multiplying the integrated power by the cost per unit power is the electricity charge.

Income/expenditure detection means

With checking the output from the wattmeter using the I/O of the PLC, power consumption is counted. In general, most wattmeters have pulse output per unit time. Every time such output appears, the data is recorded on the storage means below.

Income/expenditure registration means

This sets the electricity charge per unit power.

Setting of several charges (including the electricity charge at night) is available. Time zone for each charge can be also set.

Income/expenditure storage means

Data with the following attributes are stored when output from the wattmeter is detected.

① Year, month, day, and time
② Electricity charge (4) Depreciation Cost

Depreciation cost of the facilities is counted. Since the period for depreciation is fixed in many cases, the depreciation cost can be easily counted with using the clock function of the CNC just by registering the cost for a certain time unit.

Income/expenditure detection means

Depreciation cost per day is detected every day.

Income/expenditure registration means

Depreciation cost is manually set for a certain time unit.

Income/expenditure storage means

Depreciation cost is counted every day.

It is counted when the machine operation is started. Attributes are as follows:

① Date
② Depreciation cost (5) Tool Consumption Cost

The tool consumption cost is calculated using the tool life management function prepared in the NC. The tool life management function is to change the tool with a spare when the utilization hours or times reach the predetermined life or to skip the current tool and proceed to the next one when any tool failure is detected during automatic measurement. This function is incorporated in the conventional CNC. Using this function, the tool consumption cost is counted.

Income/expenditure detection means

Every time a tool is skipped or tool life is reached, it is detected as the tool consumption.

Income/expenditure registration means

The tool life management function takes the same type of tools as a group for spare tool change. By registering the tool cost for each group, the cost of tool change can be counted.

Income/expenditure storage means

Data with the following attributes are stored every time a tool is skipped or tool life is reached.

① Date, hours, and min. of tool change (when tool life is reached or when tool is skipped)
② Tool group No.
③ Tool unit price (6) Coolant/lubrication Oil Counting Consumption costs for coolant and lubrication oil are counted.

Because it would be troublesome to have the operator strictly set the amount and times of oil change, the amount is counted by multiplying the cost per unit time by the time.

Income/expenditure detection means

Lubrication oil is generally applied for every certain unit time during operation. Therefore, operation time is counted. Coolant is generally circulated and collected and changed at certain intervals. It can be set from the screen at the time of change or can be supposed from coolant utilization time by counting the coolant pump operation time so as to save the labor of setting. As the coolant pump operation time, the output from the PLC controlling the pump is used. By counting the coolant utilization time, it becomes possible to inform the operator of rough change timing. The coolant consumption cost is calculated in respective cases by multiplying the unit time cost by the time.

Income/expenditure registration means

Consumption costs per unit time for lubrication oil and coolant are registered.

Income/expenditure storage means

Data having the following attributes are stored for every unit time.

① Date, hours, and min.
② Consumption cost of coolant or lubrication oil (7) Maintenance Charge In the event of machine failure or periodic inspection, maintenance cost is required. Means for counting such cost as expenditure is provided.

Income/expenditure detection means

When the maintenance is conducted, a serviceman sets the maintenance cost.

Income/expenditure registration means

None

Income/expenditure storage means

Upon completion of service, the following data are set and stored into the CNC.

① Date and time of work completion
② Amount
③ Company name
④ Work contents (8) Miscellaneous Cost Any cost other than above can be added to the expenditure by manual setting. This includes, for example, purchase costs of jigs and tool holders.

Income/expenditure detection means

For any expenditure not listed as an item, manual setting is applied.

Income/expenditure registration means

None

Income/expenditure storage means

Expenditure data is stored for every setting. Attributes are as follows:

① Date and time (automatically set at input and can be manually corrected)
② Description 3. Storage Data Example FIG. 3 shows an image of the income/expenditure data stored in the NC as described above.

4. Execution of Calculation

These data are calculated to sum up as follows:

(1) Operation

Press the income/expenditure calculation button.

Input password.

Input the period for profit calculation.

Profit can be calculated not only by period, but also by workpiece. For the latter case, input the program No. in addition to the period. When this item is blank, calculation is made for all workpieces.

(2) Processing of Profit Calculation Application

Income

Among the data applicable to the set period, the income amounts are extracted by the application. Their total is assumed to be the income for the period.

Expenditure

Among the data applicable to the set period, the expenditure amounts are extracted by the application. Their total is assumed to be the expenditure for the period.

When any program No. is designated, expenditure per unit time for personnel expenses or the like is calculated using the following formula.

> Cost of applicable workpiece=(Program operation time for the applicable workpiece during the period/All program operation time during the period)×Expenditure amounts during the period To display the profit, it is calculated by applying the following formula to the cost determined as above:

> Profit during the period=Total income−Total expenditure

5. Effect

With the present invention, the profit status of the machines can be easily grasped to facilitate distinction between the efficient machines and those with poor efficiency. By executing the profit calculation for each workpiece, those with a high profit ratio and those with a poor ratio can be distinguished. Detailed records of operation statuses facilitate calculation of the operation ratio.

INDUSTRIAL APPLICABILITY

Although an NC machine tool is used as an example in the embodiment described above, the method and device to determine the operation balance according to the present invention can be applied not only to NC machine tools, but also to any other production or assembly machines. By detecting the operations related to income and expenditure for each machine, the operation balance for a predetermined period can be automatically determined according to the present invention, which enables appropriate control of the machines in use and facilitates determination of their contribution ratios.

What is claimed is:

1. A method for determining an operation balance of a machine, comprising:

detecting income/expenditure-related operations of the machine as income/expenditure data;

storing income/expenditure amounts in a memory based on the detected income/expenditure data; and determining the operation balance of individual machines for any arbitrary period based on the stored income/expenditure amounts.

2. The method for determining the operation balance of the machine according to any one of claim 1, wherein information showing the attributes of the income/expenditure-related operations is added to the stored income/expenditure data.

3. A device for determining an operation balance of the machine, comprising:

an income/expenditure-related operation detection unit that detects income/expenditure-related operations of the machine as income/expenditure data;

an income/expenditure data storage unit that stores income/expenditure amounts in a memory based on the detected income/expenditure data; and an income/expenditure determining unit that determines the operation balance of individual machines for any arbitrary period based on the stored income/expenditure amounts.

4. The device for determining the operation balance of the machine according to claim 3, wherein the income/expenditure data storage unit is connected to an income/expenditure price registration unit that supplies the amounts for income/expenditure-related operations.

5. The device for determining the operation balance of the machine according to claim 3, wherein:

a mode-switching signal is supplied to the income/expenditure-related operation detection unit to distinguish between a machine test mode and a machine operation mode, and the income/expenditure-related operation detection unit does not detect income/expenditure-related operations in the machine test mode.

6. The device for determining the operation balance of the machine according to claim 3, wherein a manual input signal is supplied to the income/expenditure-related operation detection unit to manually detect certain operations.

7. The device for determining the operation balance of the machine according to claim 3, wherein the income/expenditure data storage unit is connected to a clock unit and can record in the memory at least one of a date and a time when the operation income/expenditure items occur.

8. A method for determining a machine operation balance in a machine tool controlled according to an NC program, comprising:

monitoring an execution status of the NC program;

detecting income/expenditure-related operations of the machine as the income/expenditure data based on the monitored execution status of the NC program;

storing the income/expenditure amounts in a memory based on the detected income/expenditure data; and determining the operation balance of individual machines for any arbitrary period based on the stored income/expenditure amounts.

9. The method for determining the operation balance of the machine according to claim 8, wherein the operation balance comprises an income item that includes at least sales income and an expenditure item that includes at least one of at least material costs, personnel expenses, electricity rates, depreciation costs, tool consumption costs, coolant/lubrication oil costs, and maintenance charges.

10. A device for determining a machine operation balance in a machine tool controlled according to an NC program, comprising:

an income/expenditure-related operation detection unit that monitors an execution status of the NC program and that detects income/expenditure-related operations of the machine as the income/expenditure data based on the monitored execution status of the NC program;

an income/expenditure data storage unit that stores income/expenditure amounts in a memory based on the detected income/expenditure data; and an income/expenditure determining unit that determines the operation balance of individual machines for any arbitrary period based on the stored income/expenditure amounts.

\* \* \* \* \*